US011254206B2

(12) United States Patent
Hayes et al.

(10) Patent No.: US 11,254,206 B2
(45) Date of Patent: Feb. 22, 2022

(54) DRIVE AXLE SYSTEM

(71) Applicant: ArvinMeritor Technology, LLC, Troy, MI (US)

(72) Inventors: Brian D Hayes, Newark, OH (US); Robert J. Martin, Harrison Township, MI (US); Pedro Garcia, Clarkston, MI (US); Chris Keeney, Troy, MI (US); Dale Eschenburg, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 16/827,102

(22) Filed: Mar. 23, 2020

(65) Prior Publication Data
US 2021/0291644 A1 Sep. 23, 2021

(51) Int. Cl.
*B60K 17/16* (2006.01)
*B60K 17/02* (2006.01)
*B60K 17/24* (2006.01)
*B60K 17/26* (2006.01)
*F16H 37/08* (2006.01)
*F16H 48/05* (2012.01)
*F16H 48/08* (2006.01)

(52) U.S. Cl.
CPC ............ *B60K 17/165* (2013.01); *B60K 17/02* (2013.01); *B60K 17/24* (2013.01); *B60K 17/26* (2013.01); *F16H 37/082* (2013.01); *F16H 48/05* (2013.01); *F16H 48/08* (2013.01)

(58) Field of Classification Search
CPC ...... B60K 17/36; B60K 17/165; B60K 17/26; F16H 48/05
See application file for complete search history.

(56) References Cited

U.S. PATENT DOCUMENTS

| | | | |
|---|---|---|---|
| 6,964,310 B2 * | 11/2005 | Hasegawa | B60K 17/34 |
| | | | 180/22 |
| 8,523,738 B2 | 9/2013 | Morscheck et al. | |
| 9,816,603 B2 * | 11/2017 | Hayes | F16C 33/6659 |
| 10,001,201 B2 | 6/2018 | Martin et al. | |
| 10,364,872 B2 | 7/2019 | Keeney et al. | |
| 10,369,885 B2 | 8/2019 | Keeney et al. | |
| 2019/0111781 A1 | 4/2019 | Keeney et al. | |
| 2019/0248234 A1 | 8/2019 | Funderburg et al. | |

(Continued)

FOREIGN PATENT DOCUMENTS

| | | | |
|---|---|---|---|
| DE | 19807578 A1 | 8/1998 | |
| GB | 1210964 A | 11/1970 | |
| GB | 1210964 A * | 11/1970 | F16H 48/16 |

OTHER PUBLICATIONS

Eschenburg et al., U.S. Appl. No. 16/190,818, filed Nov. 14, 2018; 85 Pages.

(Continued)

*Primary Examiner* — Derek D Knight
(74) *Attorney, Agent, or Firm* — Brooks Kushman PC

(57) ABSTRACT

A drive axle system having a one-way freewheel clutch. The one-way freewheel clutch is configured to transmit torque between first and second axle assembles when an interaxle differential unit is unlocked. The one-way freewheel clutch transmits torque to one of the first axle assembly and the second axle assembly when the interaxle differential unit is locked.

23 Claims, 12 Drawing Sheets

(56) References Cited

U.S. PATENT DOCUMENTS

2019/0316665 A1  10/2019  Keeney et al.
2019/0316666 A1  10/2019  Keeney et al.
2020/0047615 A1   2/2020  Eschenburg et al.

OTHER PUBLICATIONS

Extended European Search Report dated Jul. 12, 2021 for related European Application No. 21152727.0; 8 Pages.

* cited by examiner

DRIVE AXLE SYSTEM

TECHNICAL FIELD

This disclosure relates to a drive axle system that may have a one-way freewheel clutch that enables and disables the transmission of torque to an axle assembly.

BACKGROUND

A drive axle system having an inter-axle differential that is a planetary differential is disclosed in U.S. Pat. No. 8,523,738.

SUMMARY

In at least one embodiment, a drive axle system is provided. The drive axle system may include a first axle assembly, a second axle assembly, an interaxle differential unit, and a one-way freewheel clutch. The first axle assembly may have a first drive pinion and a first differential assembly. The first differential assembly may have a first ring gear. The first drive pinion and the first ring gear may cooperate to provide a first gear ratio. The second axle assembly may have a second drive pinion and a second differential assembly. The second differential assembly may have a second ring gear. The second drive pinion and the second ring gear may cooperate to provide a second gear ratio. The interaxle differential unit may be operatively connectable with the first axle assembly and the second axle assembly. The one-way freewheel clutch may transmit torque between the first axle assembly and the second axle assembly when the interaxle differential unit is unlocked. The one-way freewheel clutch may transmit torque to one of the first axle assembly and the second axle assembly when the interaxle differential unit is locked.

The interaxle differential unit may transmit torque to the first axle assembly but not to the second axle assembly when the interaxle differential unit is unlocked and the first gear ratio is less than the second gear ratio.

The interaxle differential unit may transmit torque to the second axle assembly but not to the first axle assembly when the interaxle differential unit is unlocked and the second gear ratio is less than the first gear ratio.

The first differential assembly may be rotatable about a first differential axis. The second differential assembly is rotatable about a second differential axis. The one-way freewheel clutch may transmit torque between the first axle assembly and the second axle assembly such that the first differential assembly may be rotatable in a first rotational direction about the first differential axis and the second differential assembly is rotatable in the first rotational direction about the second differential axis when the interaxle differential unit is unlocked.

The one-way freewheel clutch may transmit torque to the first axle assembly to rotate the first differential assembly about the first differential axis in a second rotational direction, such as a reverse direction that is opposite the first rotational direction, when the first gear ratio is less than the second gear ratio and the interaxle differential unit is locked.

The one-way freewheel clutch may transmit torque to the second axle assembly to rotate the second differential assembly about the second differential axis in a second rotational direction, such as a reverse direction that is opposite the first rotational direction, when the second gear ratio is less than the first gear ratio and the interaxle differential unit is locked.

The interaxle differential unit may be disposed in the first axle assembly.

The interaxle differential unit and the first drive pinion may be rotatable about a first axis.

The one-way freewheel clutch may be provided with the interaxle differential unit.

In at least one configuration, the interaxle differential unit may include a first side gear that may receive the first drive pinion, a second side gear that may be fixed to an output shaft, and a pinion gear that meshes with the first side gear and the second side gear. The one-way freewheel clutch may receive the first drive pinion and may be received in the first side gear.

The one-way freewheel clutch may couple the first side gear to the first drive pinion such that the first side gear and the pinion gear are rotatable together when torque is provided to the first side gear in a first direction. The one-way freewheel clutch may permit rotation of the first side gear with respect to the first drive pinion when torque is provided in a second direction that is opposite the first direction.

The interaxle differential unit may include a case that receives the first side gear, the second side gear, and the pinion gear. An interaxle differential lock may selectively couple the first side gear to the case such that the first side gear and the case are rotatable together when the interaxle differential lock is in a locked position and the case is rotatable with respect to the first side gear when the interaxle differential lock is in an unlocked position.

The one-way freewheel clutch may be received in the case.

The interaxle differential lock may include a disc pack that may extend around the first side gear and may be received in the case.

In another configuration, the interaxle differential unit may include a planet carrier that may be rotatable about an axis with an input shaft, a planetary ring gear that may be rotatable about the axis with an output shaft, a sun gear that may receive the first drive pinion, and a planet gear that may be rotatably disposed on the planet carrier and may mesh with the planetary ring gear and the sun gear. The one-way freewheel clutch may be received in the sun gear.

The one-way freewheel clutch may receive the first drive pinion.

The one-way freewheel clutch may couple the sun gear to the first drive pinion such that the sun gear and the first drive pinion may be rotatable together when the torque is provided to the sun gear in a first direction. The one-way freewheel clutch may permit rotation of the sun gear with respect to the first drive pinion when torque is provided in a second direction that is opposite the first direction.

The interaxle differential unit may include an interaxle differential lock that selectively couples the sun gear to the planet carrier such that the sun gear and the planet carrier are rotatable together when the interaxle differential lock is in a locked position. The planet carrier may be rotatable with respect to the sun gear when the interaxle differential lock is in an unlocked position.

The one-way freewheel clutch may be received in the planet carrier. The second one-way freewheel clutch may be received in the sun gear. The sun gear may haves a spacer portion that may be axially positioned between the one-way freewheel clutch and the second one-way freewheel clutch.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
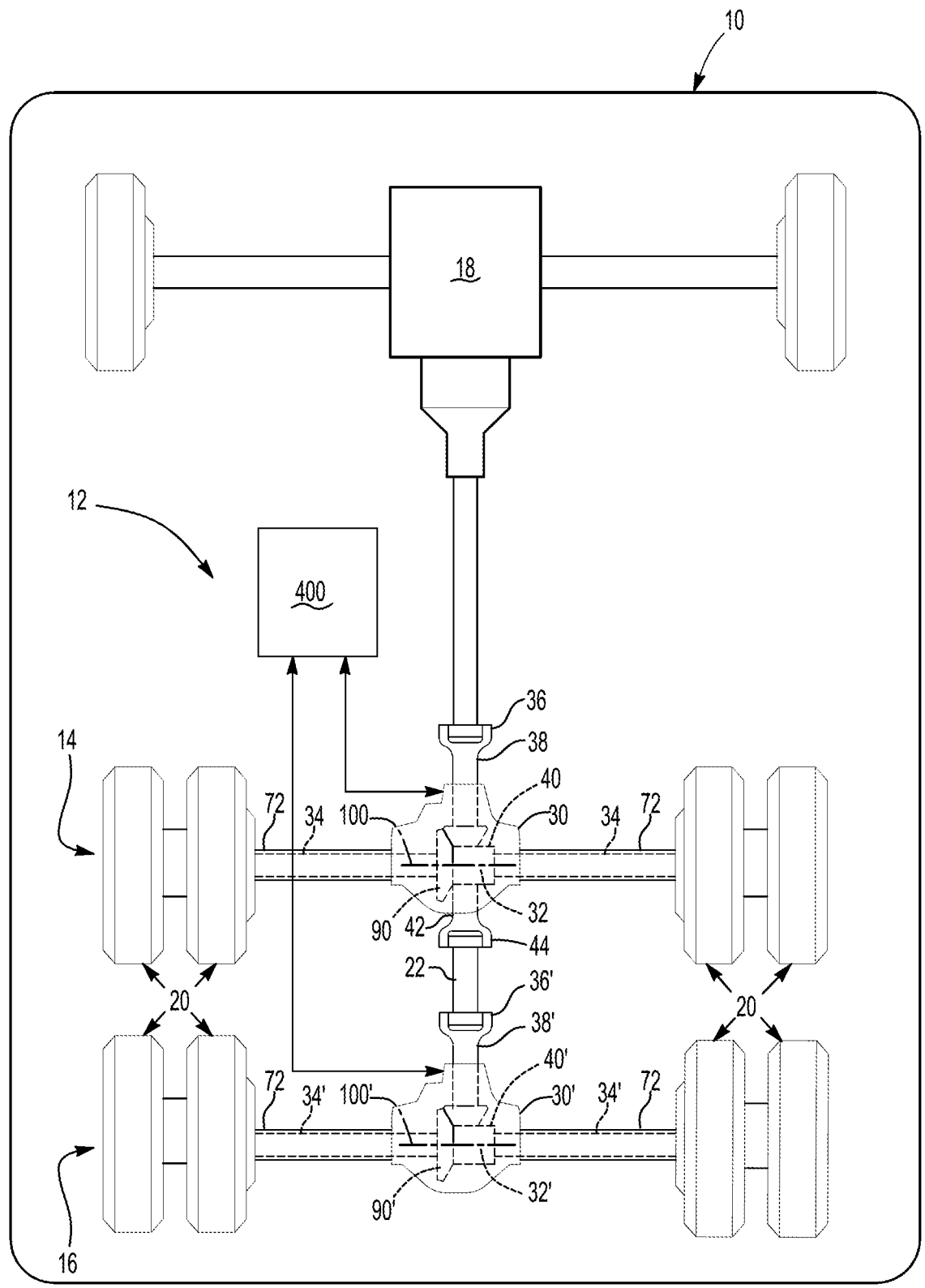
FIG. 1 illustrates an example of a drive axle system.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments.

The vehicle 10 may have a drive axle system 12 that may include a plurality of axle assemblies, such as a front axle assembly 14 and a rear axle assembly 16. The front axle assembly 14 and the rear axle assembly 16 may be drive axle assemblies. A drive axle assembly may provide torque to one or more wheel assemblies 20 that may be rotatably supported on the axle assembly. A wheel assembly 20 may include a tire disposed on a wheel. A drive axle assembly may be part of a vehicle drivetrain and may receive torque from at least one power source or torque source 18, such as an engine, electric motor, transmission, transfer case, or another axle assembly.

In FIG. 1, two drive axle assemblies are shown in a tandem axle configuration, although it is contemplated that a greater number of axle assemblies may be provided. In a tandem configuration, the front axle assembly 14, which may also be referred to as a forward-rear axle assembly, may be connected in series with the rear axle assembly 16, which may also be referred to as a rear-rear axle assembly. The front axle assembly 14 may be operatively connected to the torque source 18, such as with a shaft or other input. An output of the front axle assembly 14 may be coupled to an input of the rear axle assembly 16, such as with a shaft like a prop shaft 22. The prop shaft 22 may be coupled to an output of the front axle assembly 14 and an input of the rear axle assembly 16 at opposing ends via couplings, such as universal joints, that may allow the front axle assembly 14 and the rear axle assembly 16 to move with respect to each other while allowing the prop shaft 22 to rotate.

As will be discussed in more detail below, torque may be selectively provided to the wheel assemblies 20 of at least one of the drive axle assemblies. For example, torque may be provided to the front axle assembly 14 and the rear axle assembly 16 and to their associated wheel assemblies 20 to provide sufficient torque to propel the vehicle 10 in various situations, such as to propel the vehicle 10 from a stationary position, when climbing a road grade, or to provide sufficient torque to meet acceleration demands. Torque may not be provided to one of the axle assemblies (e.g., torque may not be provided to the wheel assemblies 20 of the front axle assembly 14 or may not be provided to the wheel assemblies 20 of the rear axle assembly 16) when torque demands are sufficiently low, such as when the vehicle is at a road cruise speed or when torque from one axle assembly is sufficient to meet propulsion or acceleration demands. Not providing torque to either the front axle assembly 14 or the rear axle assembly 16 may help improve axle operating efficiency and fuel economy.

Figure 2:
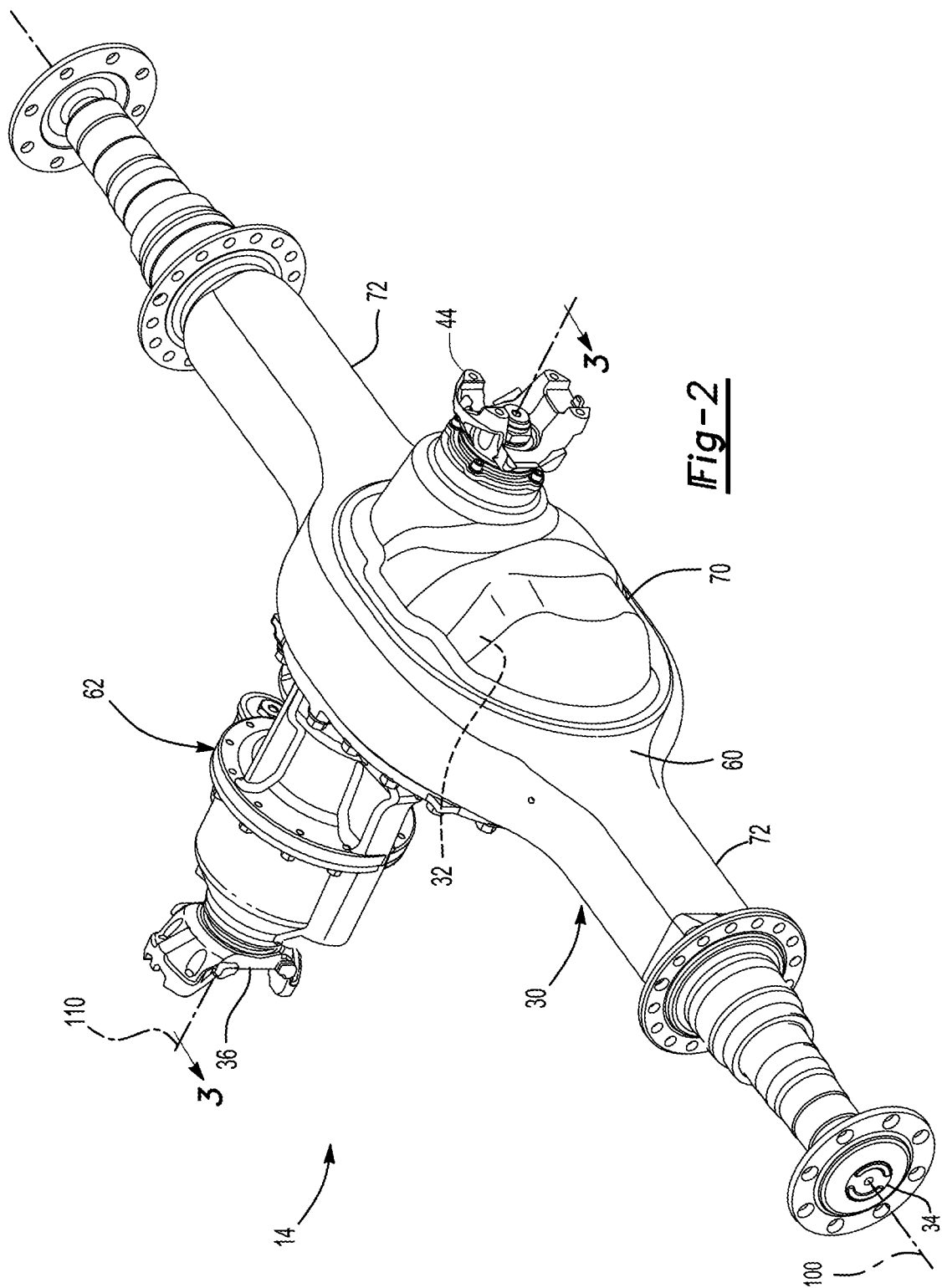
FIG. 2 is a perspective view of an example of an axle assembly that may be provided with the drive axle system.
Figure 3:
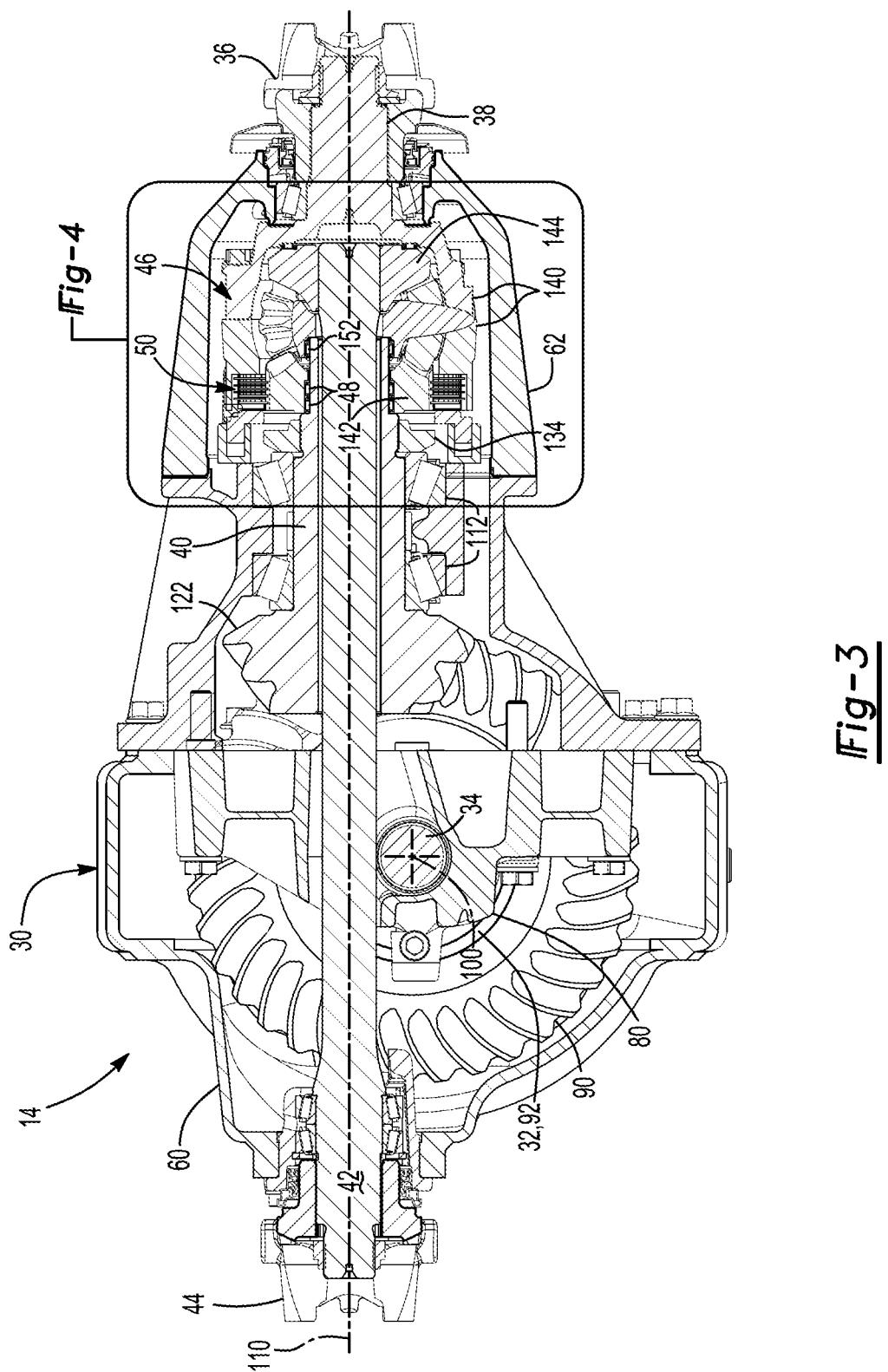
FIG. 3 is a section view of the axle assembly of FIG. 2 along section line 3-3.

Referring to FIGS. 2 and 3, an example of an axle assembly is shown. The example shown in FIGS. 2 and 3 is primarily referenced below in the context of being the front axle assembly 14; however, it is to be understood that the front axle assembly 14 may be provided in other configurations, including but not limited to locating the interaxle differential unit outside the front axle assembly 14, by providing a drop gear configuration in which a drive gear and a driven gear provide torque from the interaxle differential unit to the drive pinion, by not routing the output shaft through a drive pinion, or combinations thereof. In the example shown, the axle assembly may include a housing assembly 30, a differential 32, a pair of axle shafts 34, an input yoke 36, an input shaft 38, a drive pinion 40, an output shaft 42, an output yoke 44, an interaxle differential unit 46, a one-way freewheel clutch 48, and an interaxle differential unit lock 50.

Referring to FIG. 2, the housing assembly 30 may receive various components of the axle assembly. In addition, the housing assembly 30 may facilitate mounting of the axle assembly to the vehicle 10. In at least one configuration, the housing assembly 30 may include an axle housing 60 and a differential carrier 62.

The axle housing 60 may receive and support the axle shafts 34. In at least one configuration, the axle housing 60 may include a center portion 70 and at least one arm portion 72.

The center portion 70 may be disposed proximate the center of the axle housing 60. The center portion 70 may define a cavity that may receive the differential 32. A lower region of the center portion 70 may at least partially define a sump portion that may contain lubricant. Splashed lubricant may flow down the sides of the center portion 70 and may flow over internal components of the axle assembly and collect in the sump portion.

One or more arm portions 72 may extend from the center portion 70. For example, two arm portions 72 may extend in opposite directions from the center portion 70 and away from the differential 32. The arm portions 72 may have substantially similar configurations. For example, the arm portions 72 may each have a hollow configuration or tubular configuration that may extend around and may receive a corresponding axle shaft 34 and may help separate or isolate the axle shaft 34 from the surrounding environment. An arm portion 72 or a portion thereof may be integrally formed with the center portion 70 or may be separate from the center portion 70.

The differential carrier 62, which may also be called a carrier housing, may be mounted to the center portion 70 of the axle housing 60. The differential carrier 62 may receive the interaxle differential unit 46 and support components of the differential 32. As is best shown in FIG. 3, the differential carrier 62 may have one or more bearing supports 80. The bearing support 80 may support a roller bearing assembly that may rotatably support the differential 32. For example, two bearing supports 80 may be received in the center portion 70 and may be located proximate opposite sides of the differential 32.

The differential 32 may be disposed in the center portion 70 of the housing assembly 30. The differential 32 may transmit torque to the wheel assemblies 20 and permit the wheel assemblies 20 of a corresponding axle assembly to rotate at different velocities in a manner known by those skilled in the art. For example, the differential 32 may have a ring gear 90 that may be fixedly mounted on a differential case 92. The ring gear 90 and the differential case 92 may be rotatable about a differential axis 100. The differential case 92 may receive differential gears that may be operatively connected to the axle shafts 34. Torque that is provided to the drive pinion 40 may be transmitted to the ring gear 90. As such, the differential 32 may receive torque via the ring gear 90 and provide torque to the axle shafts 34 and to its associated wheel assemblies 20.

Referring to FIGS. 1-3, the axle shafts 34 may be configured to transmit torque from an associated differential to corresponding wheel assemblies 20. For example, two axle shafts 34 may be provided such that each axle shaft 34 extends through a different arm portion 72 of axle housing 60. The axle shafts 34 may extend along and may be rotatable about the differential axis 100.

The input yoke 36, if provided, may facilitate coupling of an axle assembly to the torque source 18. The input yoke 36 may be mounted on the input shaft 38. For example, the input yoke 36 may have an opening that receives the input shaft 38 and may be secured to the input shaft 38 with a fastener, such as a nut.

Figure 7:
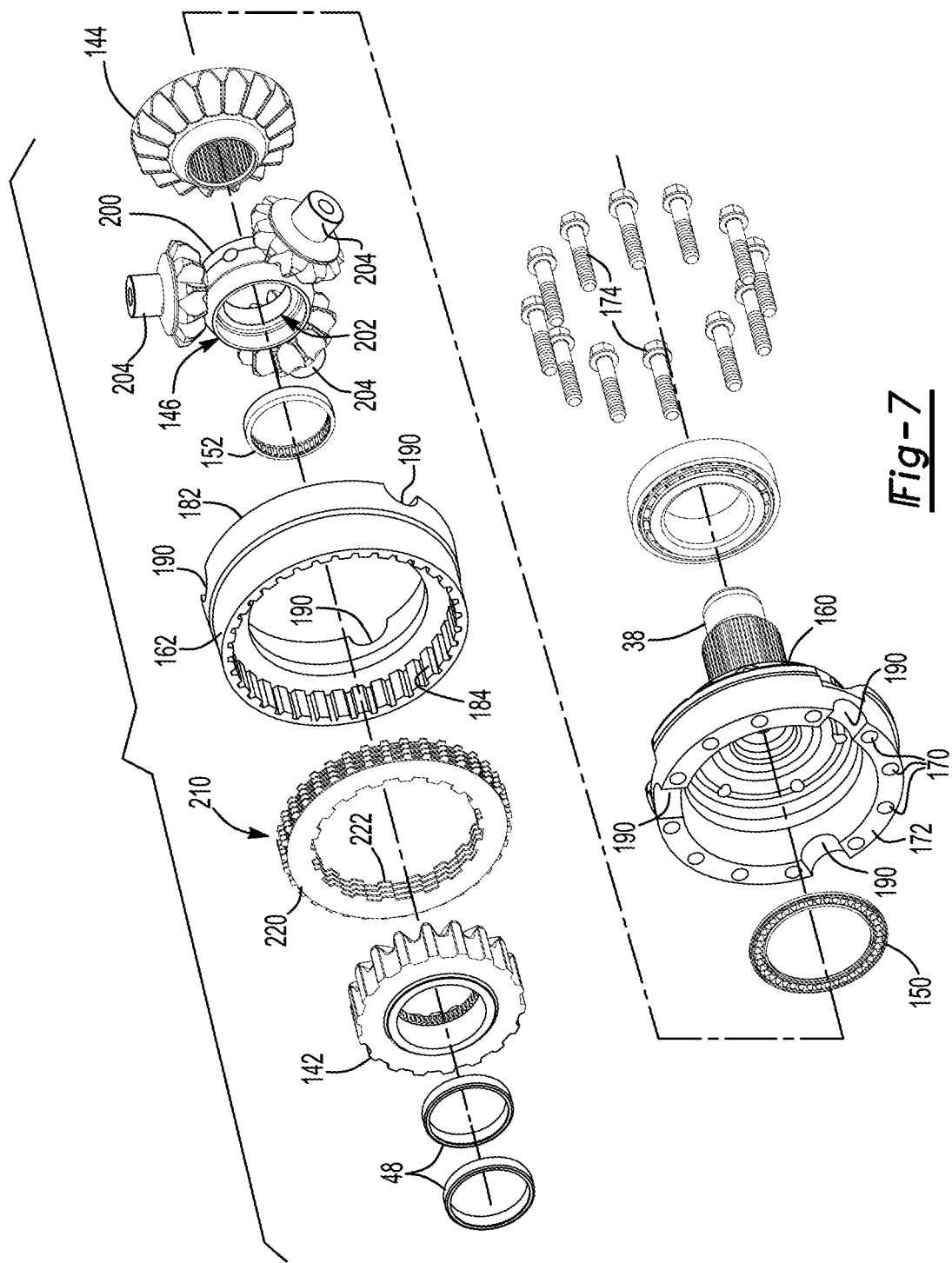

Referring primarily to FIGS. 3 and 7, the input shaft 38 may extend along and may be configured to rotate about a first axis 110. For example, the input shaft 38 may be rotatably supported at least one roller bearing assembly, which may be referred to as an input bearing, that may be disposed on the differential carrier 62. The input shaft 38 may be part of the interaxle differential unit 46 or may be operatively connected to the interaxle differential unit 46. For instance, the input shaft 38 may be integrally formed with a case of the interaxle differential unit 46 or may be provided as a separate component that is fixedly coupled to the case in one or more embodiments. In at least one configuration, the input shaft 38 may be connected to or may have an enlarged cup portion at an end that is disposed opposite the input yoke 36. The cup portion may be part of the case of the interaxle differential unit 46 and may at least partially define a cavity that may receive components of the interaxle differential unit 46. The first axis 110 may be disposed at any suitable angle with respect to the differential axis 100, such as in a nonparallel relationship, at an oblique angle, or substantially perpendicular to the differential axis 100.

Figure 6:
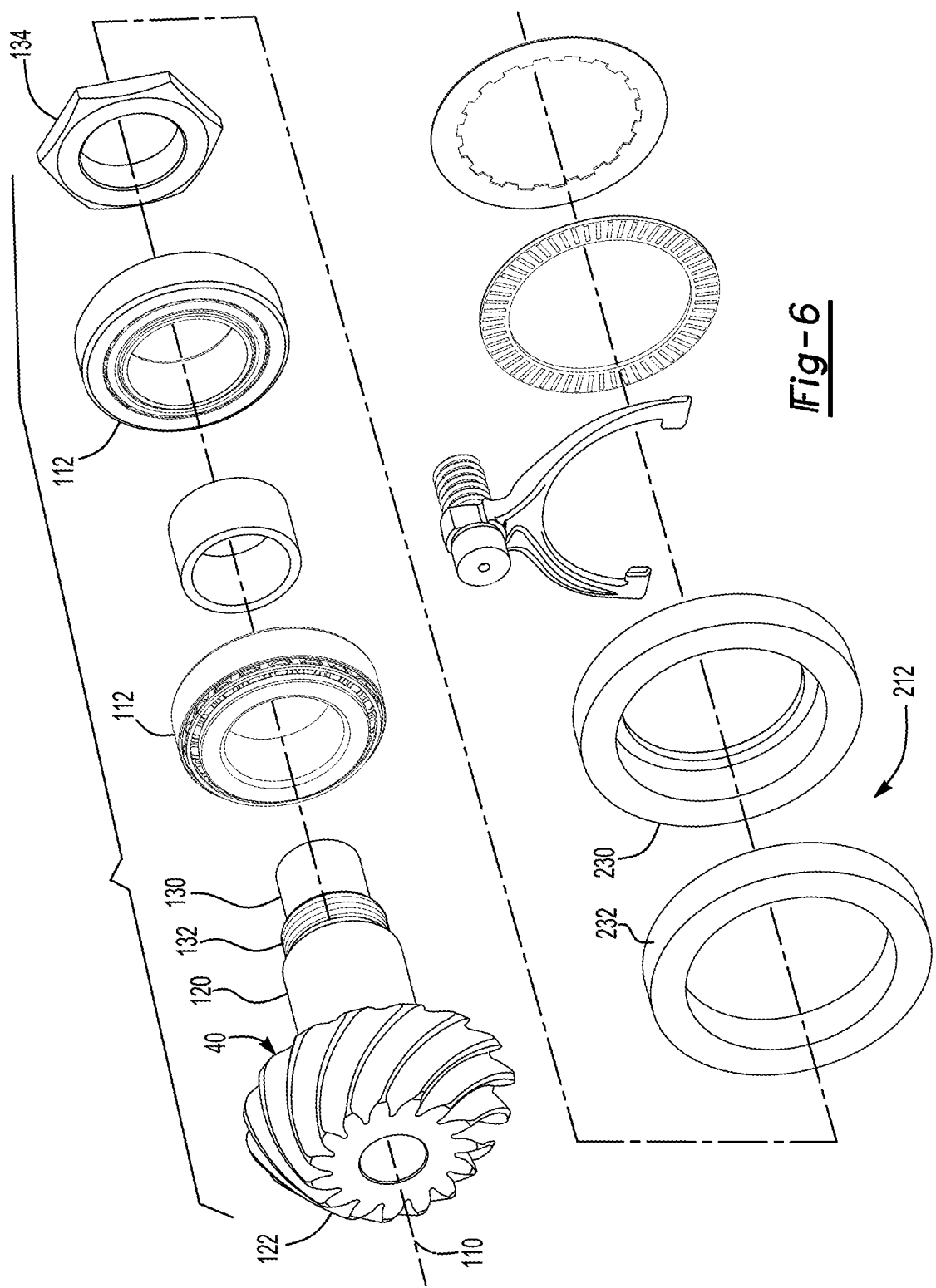
FIGS. 6 and 7 are exploded views of some components of the axle assembly shown in FIG. 3.

Referring primarily to FIGS. 3 and 6, the drive pinion 40 may provide torque to the differential 32. In at least one configuration, the drive pinion 40 may extend along and may be configured to rotate about the first axis 110. The drive pinion 40 may be rotatably supported by one or more roller bearing assemblies 112 that may be disposed on the differential carrier 62. In at least one configuration, the drive pinion 40 may include a shaft portion 120 and a gear portion 122.

In at least one configuration, the shaft portion 120 may extend from the interaxle differential unit 46 to the gear portion 122. Optionally, the shaft portion 120 may at least partially define a passage through which the output shaft 42 may extend. The shaft portion 120 may also include an end portion 130 and a threaded portion 132.

Figure 4:
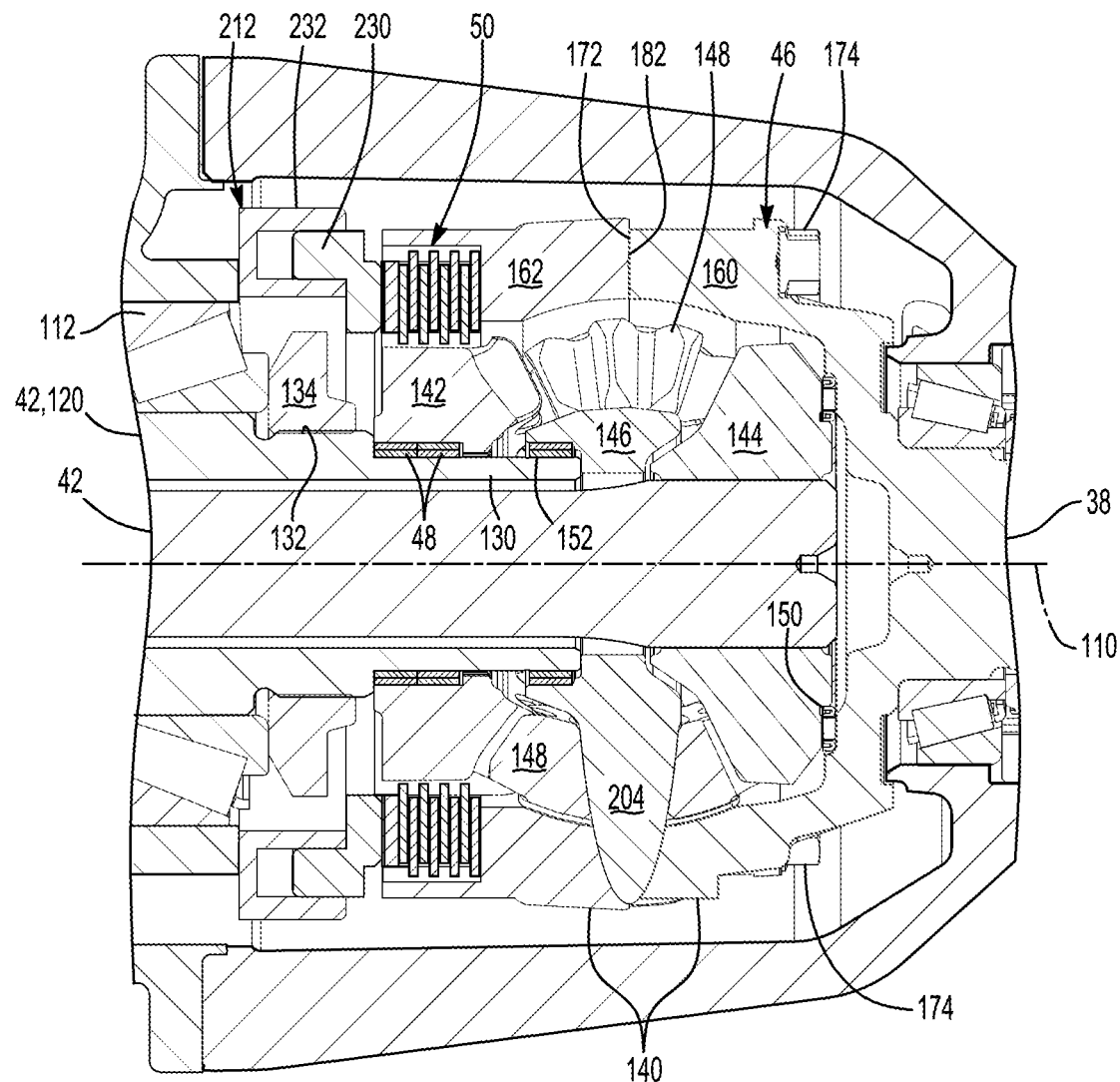
FIG. 4 is a magnified view of a portion of the axle assembly shown in FIG. 3 with an interaxle differential lock in an unlocked position.

Referring primarily to FIGS. 4 and 6, the end portion 130 may extend from a distal end of the shaft portion 120 that may be disposed opposite the gear portion 122. The end portion 130 may have an exterior circumferential surface that may extend in an axial direction from the distal end of the shaft portion 120 toward or to the threaded portion 132. The end portion 130 may support one or more one-way freewheel clutches 48, which in turn may support a gear of the interaxle differential unit 46 as will be discussed in more detail below. The end portion 130 may have a smaller diameter than the threaded portion 132.

The threaded portion 132 may be axially positioned between the end portion 130 and the gear portion 122. The threaded portion 132 may extend around the first axis 110. The thread or threads of the threaded portion 132 may mate with corresponding threads of an adjuster nut 134, that may exert a preload force on the roller bearing assemblies 112 and may inhibit axial movement of at least one roller bearing assembly 112 away from the gear portion 122.

The gear portion 122 may be disposed at an end of the shaft portion 120. The gear portion 122 may have a plurality of teeth that may mesh or mate with corresponding teeth on the ring gear 90.

Referring to FIGS. 3 and 4, the output shaft 42 may extend along and may be configured to rotate about an axis, such as the first axis 110. For instance, the output shaft 42 may be supported by one or more roller bearings that may be disposed on the housing assembly 30, such as one or more output bearings that may be disposed near or at an opposite end of the housing assembly 30 from the input bearing. Optionally, the output shaft 42 may extend through the drive pinion 40 and may extend at least partially through the interaxle differential unit 46 as will be discussed in more detail below. The output shaft 42 may be operatively connected to or coupled to the interaxle differential unit 46 at a first end. For example, the output shaft 42 may be fixedly coupled a gear of the interaxle differential unit 46 as will be discussed in more detail below. The output shaft 42 may be fixedly coupled to the output yoke 44 at a second end that may be disposed opposite the first end.

Referring to FIGS. 1 and 3, the output yoke 44, if provided, may facilitate coupling of the output shaft 42 to the rear axle assembly 16. For example, the output yoke 44 may be coupled to a connecting shaft, such as the prop shaft 22. The output yoke 44 may be mounted on the output shaft 42. For instance, the output yoke 44 may have an opening that receives the output shaft 42 may be secured to the output shaft 42 with a fastener like a nut.

Referring to FIGS. 3 and 4, the interaxle differential unit 46 may be operatively connectable with the front axle assembly 14 and the rear axle assembly 16. The interaxle differential unit 46 may compensate for speed differences between different axle assemblies, such as speed differences between the front axle assembly 14 and the rear axle assembly 16. It is contemplated that the interaxle differential unit 46 may be provided with the front axle assembly 14, the rear axle assembly 16, or at an intermediate location between the front axle assembly 14 and the rear axle assembly 16.

The interaxle differential unit may be provided in various configurations. In the configuration shown in FIGS. 3-7, the interaxle differential unit 46 does not include a planetary gear set. In such a configuration, the interaxle differential unit 46 may include a case 140, a first side gear 142, a second side gear 144, a spider 146, and a plurality of pinion gears 148. The interaxle differential unit 46 may also include one or more thrust bearings 150, a stabilizer bearing 152, or combinations thereof.

Referring primarily to FIG. 4, the case 140 may be configured to receive components of the interaxle differential unit 46. In addition, the case 140 may be rotatable about the first axis 110. In at least one configuration such as is shown in FIGS. 4 and 7, the case 140 may include a first case portion 160 and a second case portion 162 that may cooperate to at least partially define a cavity. The cavity may at least partially receive the first side gear 142, second side gear 144, spider 146, pinion gears 148, thrust bearing 150, and the stabilizer bearing 152.

Referring to FIGS. 4 and 7, the first case portion 160 may extend around the first axis 110 and may receive at least a portion of the interaxle differential unit 46. The first case portion 160 may be configured as a unitary or one piece component that includes the input shaft 38 or may be a separate component from the input shaft 38. In at least one configuration, the first case portion 160 may include a plurality of fastener holes 170 and a first end surface 172.

The fastener holes 170 may be arranged around the first axis 110 and may receive a corresponding fastener 174, such as a bolt, that may fixedly couple the first case portion 160 to the second case portion 162.

The first end surface 172 that may face toward and may engage the second case portion 162.

The second case portion 162 may be disposed opposite the first case portion 160 and may receive at least a portion of the interaxle differential unit 46. The second case portion 162 may be configured as a ring that may extend around the first axis 110 and may include plurality of fastener holes that may receive a corresponding fastener 174. The second case portion 162 may also include a second end surface 182 and a set of teeth 184.

The second end surface 182 may face toward and may engage the first end surface 172.

The set of teeth 184 may be disposed at an end of the second case portion 162 that is disposed opposite the second end surface 182 and that may face away from the first case portion 160. The set of teeth 184 may be arranged around the first axis 110 and may extend toward the first axis 110. The set of teeth 184 may receive and mesh with the interaxle differential unit lock 50.

Referring to FIG. 7, the first case portion 160 may cooperate with the second case portion 162 to define one or more spider shaft holes 190. The spider shaft holes 190 may be generally disposed between the first end surface 172 of the first case portion 160 and the second end surface 182 of the second case portion 162. A spider shaft hole 190 may receive a shaft of the spider 146 as will be discussed in more detail below. In the configuration shown, three spider shaft holes 190 are shown; however, it is contemplated that a greater or lesser number of spider shaft holes 190 may be provided. The spider shaft holes 190 may be spaced apart from each other and may be arranged around the first axis 110. For example, spider shaft holes 190 may be disposed along axes that may be disposed substantially perpendicular to the first axis 110.

Referring to FIGS. 4 and 7, the first side gear 142 may extend around the first axis 110 and the drive pinion 40. For example, the first side gear 142 may have a center bore that may receive the shaft portion 120 of the drive pinion 40. In addition, the center bore may receive the one-way freewheel clutch 48. The first side gear 142 may be spaced apart from the drive pinion 40 and may be selectively rotatable with the drive pinion 40 and selectively rotatable with respect to the drive pinion 40 due to the functionality of the one-way freewheel clutch 48 as will be discussed in more detail below.

The second side gear 144 may be disposed on the output shaft 42. For example, the second side gear 144 may be extend around the first axis 110 and may have a center bore that may receive the output shaft 42. The center bore may include a spline that may receive and engage a corresponding spline on the output shaft 42. As such, the second side gear 144 may not rotate about the first axis 110 with respect to the output shaft 42.

Referring to FIGS. 4 and 7, an example of a spider 146 is shown. The spider 146 may be fixedly positioned with respect to the case 140 and may be rotatable with respect to the drive pinion 40. In at least one configuration, the spider 146 may be axially positioned in the case 140 between the first side gear 142 and the second side gear 144. The spider 146 may be spaced apart from and may not engage the output shaft 42. As such, the spider 146 may be rotatable with respect to the output shaft 42. In at least one configuration, spider 146 may include an annular spider body 200, a spider hole 202, and one or more spider shafts 204.

The annular spider body 200 may be axially positioned between the second side gear 144 and the drive pinion 40. The annular spider body 200 may at least partially define the spider hole 202.

The spider hole 202 may be a through hole that may extend through the annular spider body 200. In at least one configuration, the output shaft 42 may extend through the spider hole 202. The drive pinion 40 may or may not be received in the spider hole 202.

One or more spider shafts 204 may extend from the annular spider body 200. In the configuration shown, three spider shafts 204 are provided; however, it is contemplated that a greater or lesser number of spider shafts 204 may be provided in one or more embodiments. The spider shafts 204 may be integrally formed with the annular spider body 200 or may be provided as separate components that are fixed to the annular spider body 200. Each spider shaft 204 may extend from the annular spider body 200 in a direction that extends away from the first axis 110. For example, each spider shaft 204 may extend along a spider shaft axis that may be disposed substantially perpendicular to the first axis 110. In addition, an end of each spider shaft 204 may be received in a corresponding spider shaft hole 190 of the case 140. A spider shaft 204 may have a generally cylindrical configuration.

Referring to FIGS. 4 and 7, a pinion gear 148 may be rotatably disposed on a corresponding spider shaft 204. Each pinion gear 148 may have teeth that may mesh with teeth on the first side gear 142 and the second side gear 144.

The thrust bearing 150, if provided, may be disposed between the case 140 and the second side gear 144. The thrust bearing 150 may rotatably support the second side gear 144 with respect to the first case portion 160.

The stabilizer bearing 152, if provided, may rotatably support the spider 146. The stabilizer bearing 152 may be received in the spider 146 and may have a hole that receives the drive pinion 40. The stabilizer bearing 152 may be axially positioned between the first side gear 142 and the second side gear 144. The stabilizer bearing 152 may have any suitable configuration. For instance, the stabilizer bearing 152 may be configured as a roller bearing assembly that may include a plurality of rolling elements that may be disposed between an inner race and an outer race. Alternatively, the stabilizer bearing 152 may be configured as a bushing that does not have rolling elements, but that permits rotation of drive pinion 40 with respect to the spider 146.

Referring to FIGS. 4 and 7, the one-way freewheel clutch 48, which may also be called an overrunning clutch, may selectively couple the interaxle differential unit 46 to the drive pinion 40. The one-way freewheel clutch 48 may disengage a drive shaft from a driven shaft when the driven shaft rotates faster than the drive shaft. The one-way freewheel clutch 48 may be of any suitable type, such as a sprage clutch, ratchet clutch, or the like. In at least one configuration, at least one one-way freewheel clutch 48 may extend around and receive the drive pinion 40 and may be received in the center bore of the first side gear 142. In the configuration shown in FIGS. 4 and 7, the one-way freewheel clutch 48 may couple the drive pinion 40 and the first side gear 142 such that they may rotate together in one rotational direction and such that the drive pinion 40 and the first side gear 142 may not rotate together in a second rotational direction that is opposite the first rotational direction. Moreover, the one-way freewheel clutch 48 may accommodate a speed difference between the drive pinion 40 and the first side gear 142 when they are rotating in the same rotational direction as will be discussed in more detail below.

Figure 5:
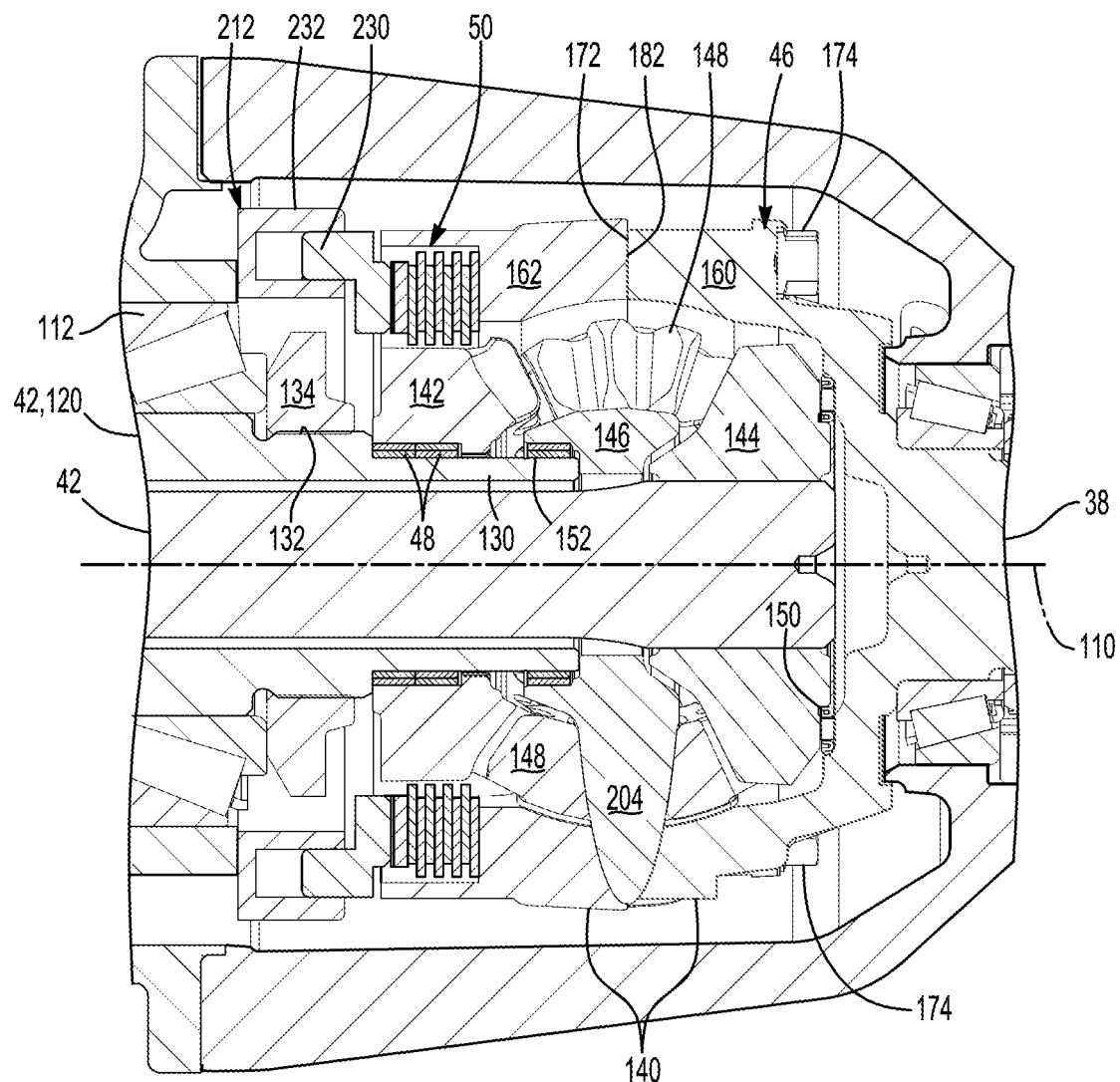
FIG. 5 is a magnified view of the portion of the axle assembly shown in FIG. 3 with the interaxle differential lock in a locked position.

Referring primarily to FIGS. 4 and 7, an example of an interaxle differential unit 50 is shown. The interaxle differential unit lock 50 may selectively unlock and lock the interaxle differential unit 46. For example, the case 140 and the first side gear 142 may be decoupled when the interaxle differential unit lock 50 is in an unlocked position as is shown in FIG. 4 such that the case 140 may be rotatable with respect to the first side gear 142. The case 140 and the first side gear 142 may be coupled when the interaxle differential unit lock 50 is in a locked position as is shown in FIG. 5 such that the case 140 and the first side gear 142 may be rotatable together.

The interaxle differential unit lock 50 may be of any suitable type, such as a clutch like a disc clutch, cone clutch, spline clutch, face clutch, or the like. In the configuration shown in FIGS. 4, 5 and 7, the interaxle differential unit lock 50 is depicted as a disc clutch that may include a disc pack 210 and an actuator 212.

The disc pack 210 may be received in the second case portion 162 and may have one or more stationary discs 220 and one or more friction discs 222. The stationary discs 220 may be mounted to the second case portion 162. For instance, the stationary discs 220 may have protrusions or teeth that may mesh with the set of teeth 184 of the second case portion 162 and may be rotatable with the second case portion 162. The friction discs 222 may be mounted to the first side gear 142 such that they are rotatable with the first side gear 142. Each friction disc 222 may be disposed adjacent to a stationary disc 220. For example, the stationary discs 220 may be spaced apart from each other such that a friction disc 222 is disposed between adjacent stationary discs 220.

The actuator 212 may be configured to move in an axial direction between a retracted position and an extended position to unlock and lock the interaxle differential unit lock 50. The actuator 212 may be of any suitable type, such as a mechanical actuator, electrical actuator, pneumatic actuator, hydraulic actuator, electromechanical actuator, or the like. In FIGS. 4, 5 and 7, the actuator 212 is depicted as a piston 230 that may be received in a piston housing 232 that may be mounted to the case 140.

In FIG. 4, the actuator 212 is shown in a retracted position in which the actuator 212 may be disposed proximate the disc pack 210 such that the stationary discs 220 and the friction discs 222 may be free to rotate with respect to each other and the interaxle differential unit 46 is unlocked.

In FIG. 5, the actuator 212 is shown in an extended position in which the actuator 212 is moved to the right with respect to the position shown in FIG. 4 to exert force against the stationary discs 220 and the friction discs 222 to deflect or urge the stationary discs 220 and the friction discs 222 into frictional engagement, which may deflect or compress the stationary discs 220 and the friction discs 222 toward the first case portion 160 and toward or against a side of the second case portion 162. The friction discs 222 may not be rotatable with respect to the stationary discs 220 when sufficient force is exerted by the actuator 212, thereby locking the interaxle differential unit 46.

Optionally, a mechanical lock, such as a collar, may be provided with the interaxle differential unit lock 50 in addition to a disc pack 210 to allow the interaxle differential unit 46 to be held in the locked position by the mechanical lock rather than relying solely on the disc pack 210.

Referring to FIG. 1, the rear axle assembly 16 may have a similar configuration as the front axle assembly 14. For clarity in reference, components of the rear axle assembly 16 that are the same or substantially similar in structure and/or function to components of the front axle assembly 14 are designated with common reference numbers followed by an apostrophe or prime symbol ('). As such, the rear axle assembly 16 may have a housing assembly 30', a differential 32', a pair of axle shafts 34', an input yoke 36', an input shaft 38', and a drive pinion 40'. The differential 32' may have a ring gear 90' that may be rotatable about a differential axis 100'. In at least one tandem axle configuration, the rear axle assembly 16 may not include an output shaft, an output yoke, an interaxle differential unit, a one-way freewheel clutch, an interaxle differential unit lock, or combinations thereof.

The front axle assembly 14 and the rear axle assembly 16 may have different gear ratios. More specifically, the drive pinion 40 and the ring gear 90 of the front axle assembly 14 may cooperate to provide a gear ratio for the front axle assembly 14 while the drive pinion 40' and the ring gear 90' of the rear axle assembly 16 may cooperate to provide a gear ratio for the rear axle assembly 16. The gear ratio of the front axle assembly 14 may be greater than the gear ratio of the rear axle assembly 16 or vice versa. As non-limiting examples, the front axle assembly 14 may have a gear ratio of 2.47 while the rear axle assembly 16 may have a gear ratio of 3.7 or vice versa.

For clarity in reference, the axle assemblies that may be provided with the drive axle system 12 may be referred to as a "first axle assembly" and a "second axle assembly" since either the front axle assembly 14 or the rear axle assembly 16 may have the higher gear ratio. In other words, the first axle assembly may be either the front axle assembly 14 or the rear axle assembly 16 while the second axle assembly may be the axle assembly that is not the first axle assembly, and thus may also be other of the front axle assembly 14 or the rear axle assembly 16.

Normally locking an interaxle differential unit in a tandem axle system in which the front axle assembly 14 and the rear axle assembly 16 have different gear ratios would result in a bound condition when all wheels are rotating at the same speed. This problem is overcome by the addition of at least one one-way freewheel clutch 48. The one-way freewheel clutch 48 may be provided with the axle assembly that has the higher numerical gear ratio. The one-way freewheel clutch 48 will allow torque to be transmitted to the axle assembly having the lower numerical gear ratio when the interaxle differential unit is locked. For instance, if the front axle assembly 14 has a higher (slower) gear ratio than the rear axle assembly 16, then the one-way freewheel clutch 48 may be "overrun" by the rotation of the wheels of the front axle assembly 14 (which may be connected via the axle shafts 34, differential 32, and drive pinion 40 of the front axle assembly 14) and forward propulsion torque may be directed to the faster (i.e., lower gear ratio) rear axle assembly 16. Conversely, if the rear axle assembly 16 has a higher (slower) gear ratio than the front axle assembly 14, then the one-way freewheel clutch may be "overrun" by the rotation of the wheels of the rear axle assembly 16 and forward propulsion torque may be directed to the faster (i.e., lower gear ratio) front axle assembly 14.

Torque may be transmitted to the front axle assembly 14 and the rear axle assembly 16 when the interaxle differential unit 46 is unlocked. Unlike a tandem axle configuration in which the front and rear axle assemblies have the same gear ratios, the side gears of the interaxle differential unit 46 may rotate at different speeds but with substantially the same torque when the interaxle differential unit 46 is unlocked. For instance, when the front axle assembly 14 has a higher (slower) gear ratio than the rear axle assembly 16, forward propulsion torque may be transmitted to the rear axle assembly 16 as well as the front axle assembly 14 when the interaxle differential unit 46 is unlocked. Similarly, when the rear axle assembly 16 has a higher (slower) gear ratio than the front axle assembly 14, forward propulsion torque may be transmitted to the front axle assembly 14 as well as the rear axle assembly 16 when the interaxle differential unit 46 is unlocked.

The drive axle system 12 may operate in a reverse direction to provide reverse propulsion torque when the interaxle differential unit 46 is locked rather than unlocked. The reverse propulsion torque and traction parameters would be dictated by the axle assembly having the lower numerical gear ratio. No meaningful torque would be transmitted in reverse through the axle assembly having the higher numerical gear ratio.

Referring to FIGS. 8-12, another configuration of an interaxle differential unit 46' is shown. This configuration of an interaxle differential unit 46' may be provided in place of the interaxle differential unit 46 previously discussed. As such, the discussion found in the four preceding paragraphs is also applicable to the interaxle differential unit 46' shown in FIGS. 8-12.

The interaxle differential unit 46' may compensate for speed and torque differences between different drive axle assemblies, such as speed differences between the front axle assembly 14 and a rear axle assembly 16 as previously discussed. In this configuration, the interaxle differential unit 46' includes a planetary gear set that may include a sun gear 300, at least one planet gear 302, a planetary ring gear 304, and a planet gear carrier 306.

Figure 8:
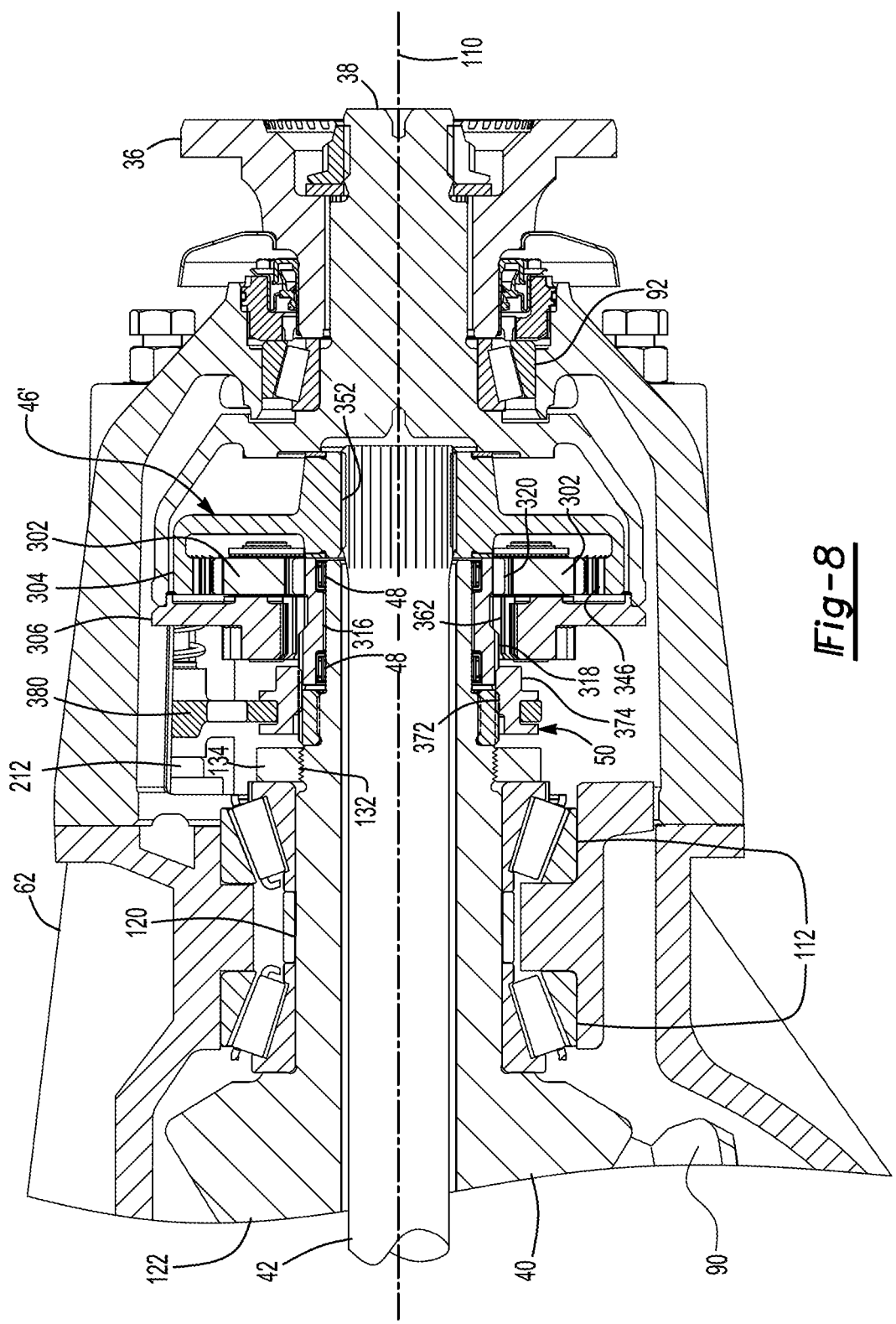
FIG. 8 is a magnified view of a portion of the axle assembly having a planetary interaxle differential unit and an example of an interaxle differential lock in an unlocked position.
Figure 11:
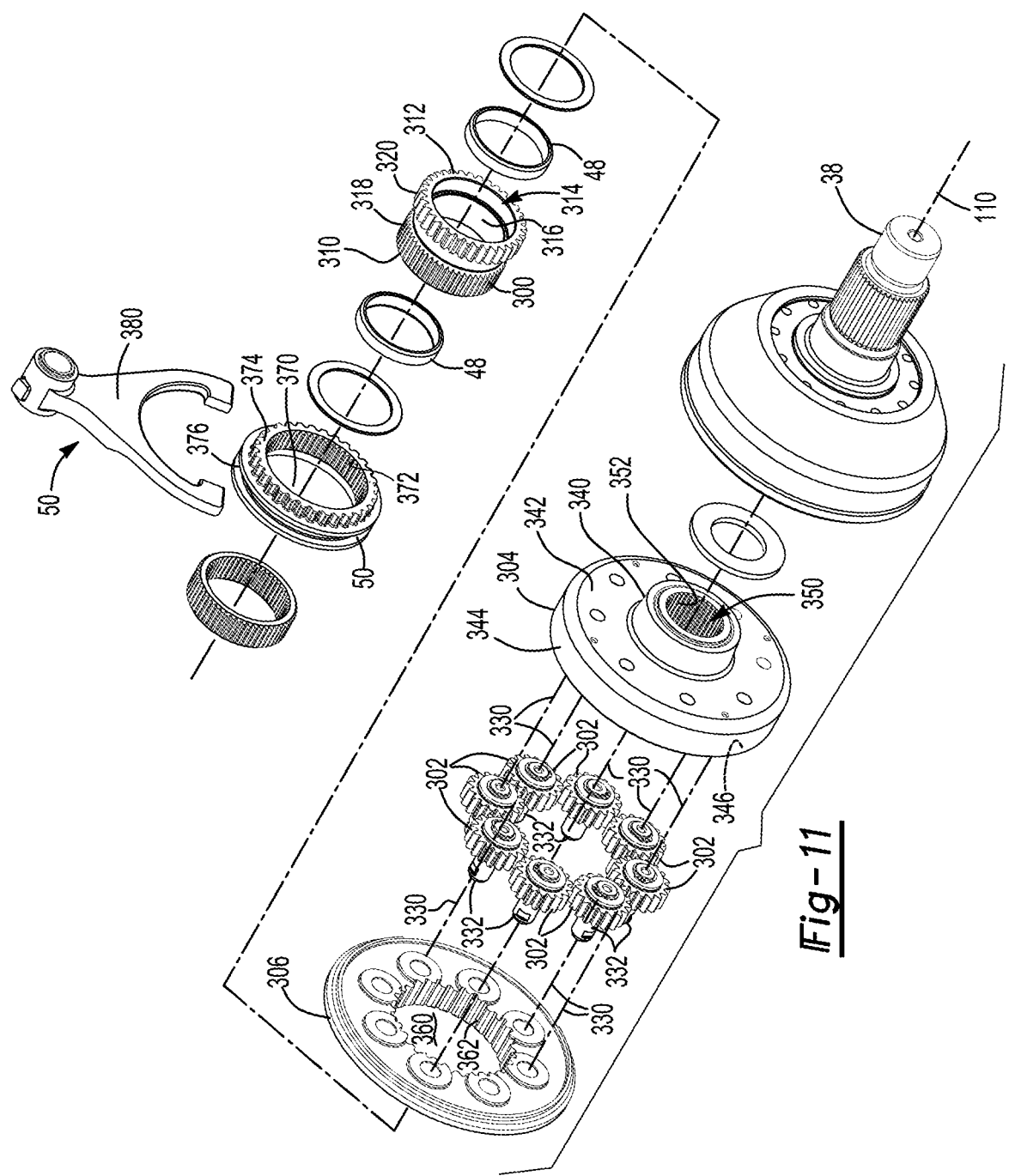

Referring primarily to FIGS. 8 and 11, the sun gear 300 may be disposed proximate the center of the planetary gear set and may be rotatable about the first axis 110. In addition, the sun gear 300 may extend through the planet gear carrier 306 and partially through the planetary ring gear 304. The sun gear 300 may be configured as a hollow tubular body that may include a first end surface 310, a second end surface 312, a sun gear hole 314, a spacer portion 316, a first set of sun gear teeth 318, and a second set of sun gear teeth 320.

The first end surface 310 may be disposed at an end of the sun gear 300 that may face toward the drive pinion 40. The first end surface 310 may be disposed outside the planetary ring gear 304 and the planet gear carrier 306.

The second end surface 312 may be disposed at an end of the sun gear 300 that may face toward the input shaft 38 and the planetary ring gear 304. As such, the second end surface 312 may be disposed opposite the first end surface 310. The second end surface 312 may be disposed inside the planetary ring gear 304.

The sun gear hole 314 may extend from the first end surface 310 to the second end surface 312. The sun gear hole 314 may extend along and may be centered about the first axis 110. The drive pinion 40 may extend into or through the sun gear hole 314 and may be spaced apart from the sun gear 300. In addition, the output shaft 42 may extend through the sun gear hole 314.

The sun gear hole 314 may receive one or more one-way freewheel clutches 48. The one-way freewheel clutches 48 may receive the drive pinion 40 as previously described and may selectively couple the drive pinion 40 and the sun gear 300. In FIGS. 8 and 11, two one-way freewheel clutches 48 are shown; however, a greater or lesser number may be provided.

The first set of sun gear teeth 318 may be disposed opposite the sun gear hole 314 and may be arranged around the sun gear hole 314 in a repeating arrangement. For example, the sun gear teeth 318 may extend radially away from the first axis 110 and may extend axially in a direction that is substantially parallel to the first axis 110. The first set of sun gear teeth 318 may be disposed closer to the first end surface 310 than the second set of sun gear teeth 320. As one example, the first set of sun gear teeth 318 may extend axially from the first end surface 310 toward the second set of sun gear teeth 320. As is best shown in FIG. 8, the first set of sun gear teeth 318 may be disposed opposite a first one-way freewheel clutch 48.

The second set of sun gear teeth 320 may be disposed opposite the sun gear hole 314 and may be arranged around the sun gear hole 314 in a repeating arrangement. For example, the sun gear teeth 320 may extend radially away from the first axis 110 and may extend axially in a direction that is substantially parallel to the first axis 110. The second set of sun gear teeth 320 may be disposed closer to the second end surface 312 than the first set of sun gear teeth 318. As an example, the second set of sun gear teeth 320 may extend axially from the second end surface 312 toward the first set of sun gear teeth 318. In at least one configuration, the second set of sun gear teeth 320 may have a larger outside diameter than the first set of sun gear teeth 318. As is best shown in FIG. 8, the second set of sun gear teeth 320 may be disposed opposite a second one-way freewheel clutch 48.

Referring to FIGS. 8 and 11, at least one planet gear 302 may be rotatably disposed between the sun gear 300 and the planetary ring gear 304. In the configuration shown, eight planet gears 302 are depicted; however, it is contemplated that a greater or lesser number of planet gears 302 may be provided. The planet gears 302 may be spaced apart from each other and each planet gear 302 may be rotatable about a different planet gear axis 330. The planet gear axes 330 may be disposed substantially parallel to the first axis 110. Each planet gear 302 may have a hole and a set of teeth. The hole may be a through hole that may extend through the planet gear 302. The hole may receive a pin 332 about which the planet gear 302 may rotate. The pin 332 may be fixedly mounted to the planet gear carrier 306. Optionally, a bearing may also be received in the hole and may rotatably support the planet gear 302 on a corresponding pin 332. The set of teeth may be disposed opposite the hole. The set of teeth may mesh with the second set of sun gear teeth 320 and teeth on the planetary ring gear 304.

The planetary ring gear 304 may extend around the first axis 110 and may receive the planet gears 302. In addition, the planetary ring gear 304 may be selectively rotatable with respect to the drive pinion 40. In at least one configuration, the planetary ring gear 304 may include a mounting hub 340, a first flange 342, and a second flange 344.

The mounting hub 340 may facilitate coupling or mounting of the planetary ring gear 304 to the output shaft 42. The mounting hub 340 may be axially positioned between the drive pinion 40 and the input shaft 38 and may define a hole that may receive the output shaft 42. In at least one configuration, the mounting hub 340 may have a mounting hub hole 350 and a mounting hub spline 352.

The mounting hub hole 350 may extend along and may be centered about the first axis 110.

The mounting hub spline 352 may be disposed in the mounting hub hole 350 and may facilitate mounting of the planetary ring gear 304 to the output shaft 42. For example, the mounting hub spline 352 may mesh or mate with a corresponding spline or set of splines on the output shaft 42 such that the planetary ring gear 304 and the output shaft 42 are rotatable together about the first axis 110.

Referring to FIG. 11, the first flange 342 may extend radially outward from the mounting hub 340 to the second flange 344.

The second flange 344 may extend from an end of the first flange 342. For instance, the second flange 344 may extend toward and may be spaced apart from the planet gear carrier 306. A set of teeth 346 may be provided on the second flange 344 that may extend toward the first axis 110 and may mesh with teeth on the planet gears 302.

Referring to FIGS. 8 and 11, the planet gear carrier 306 may be rotatable about the first axis 110. For example, the planet gear carrier 306 may be fixedly coupled to the cup portion of the input shaft 38. As such, the input shaft 38 and the planet gear carrier 306 may rotate together about the first axis 110. The planet gear carrier 306 may support the pins 332. For example, the pins 332 may extend from a side of the planet gear carrier 306 that faces toward the first flange 342 of the planetary ring gear 304. In at least one configuration, the planet gear carrier 306 may include a planet carrier hole 360 and a set of planet carrier teeth 362.

The planet carrier hole 360 may extend around the first axis 110 and may receive the sun gear 300 such that the planet gear carrier 306 is spaced apart from the sun gear 300.

The set of planet carrier teeth 362 may be disposed in the planet carrier hole 360 and may extend toward the first axis 110. The planet carrier teeth 362 may be arranged in a repeating arrangement around the first axis 110 and may extend axially in a direction that is substantially parallel to the first axis 110. The interaxle differential unit lock 50 may selectively mesh or mate with the set of planet carrier teeth 362 as will be discussed in more detail below. The set of planet carrier teeth 362 may be disposed closer to the first axis 110 than the planet gear axes 330.

Referring to FIGS. 8 and 11, the interaxle differential unit lock 50 may be movable in an axial direction or in a direction that extends along the first axis 110 between an unlocked position and a locked position as previously discussed. In addition, the interaxle differential unit lock 50 may have any suitable configuration as previously discussed. In FIGS. 8-11, the interaxle differential unit lock 50 is configured as a collar that may be generally ring-shaped and may include a collar hole 370, a set of internal teeth 372, a set of external teeth 374, and a collar groove 376.

The collar hole 370 may be a through hole that may extend through the interaxle differential unit lock 50 and extend around the first axis 110. The collar hole 370 may receive the drive pinion 40 and may selectively receive the sun gear 300.

Figure 12:
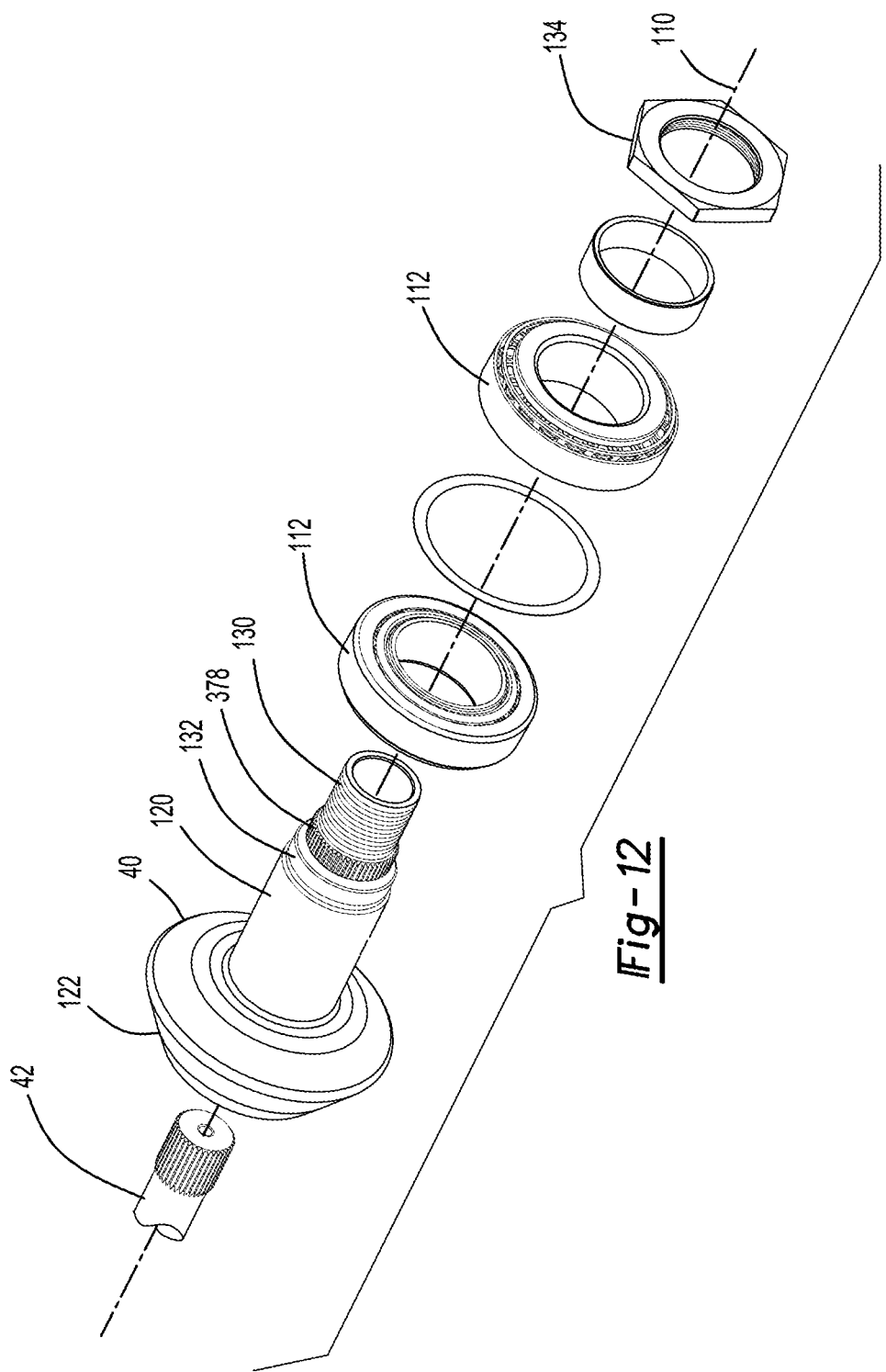

The set of internal teeth 372 may be disposed in the collar hole 370. The internal teeth 372 may extend toward the first axis 110 and may mesh or mate with corresponding teeth 378 on the drive pinion 40, which are is best shown in FIG. 12, or teeth on an intervening ring that may receive the drive pinion 40. As such, the mating teeth may allow the interaxle differential unit lock 50 to move in an axial direction or along the first axis 110 while inhibiting rotation of the interaxle differential unit lock 50 about the first axis 110 with respect to the drive pinion 40.

The set of external teeth 374 may be disposed opposite the collar hole 370 and the set of internal teeth 372. The external teeth 374 may extend away from the first axis 110 and may selectively mesh or mate with the set of planet carrier teeth 362.

The collar groove 376 may face away from the first axis 110 and may extend around the first axis 110. The collar groove 376 may receive a linkage, such as a shift fork 380, that may operatively connect the interaxle differential unit lock 50 to the actuator 212. The actuator 212 may move the interaxle differential unit lock 50 between the unlocked position and the locked position.

Referring to FIG. 8, the interaxle differential unit lock 50 is shown in the unlocked position. The set of internal teeth 372 of the interaxle differential unit lock 50 may mesh or mate with teeth 378 of the drive pinion 40 or that are fixedly positioned with respect to the drive pinion 40 and with the first set of sun gear teeth 318. The set of external teeth 374 may be spaced apart from and may not mesh or mate with the planet carrier teeth 362 when the interaxle differential unit lock 50 is in the unlocked position. As such, the sun gear 300 and the drive pinion 40 may rotate together about the first axis 110. Torque may be transmitted to the front axle assembly 14 and the rear axle assembly 16 when the interaxle differential unit lock 50 is in the unlocked position. For example, torque may be transmitted from the interaxle differential unit 46' to the drive pinion 40 via the sun gear 300 and the interaxle differential unit lock 50 while torque may be transmitted from the interaxle differential unit 46' to the output shaft 42 via the planetary ring gear 304 and planet gears 302. Moreover, the planetary gear set of the interaxle differential unit 46' may allow the drive pinion 40 and the output shaft 42 to rotate at different speeds about the first axis 110.

Figure 9:
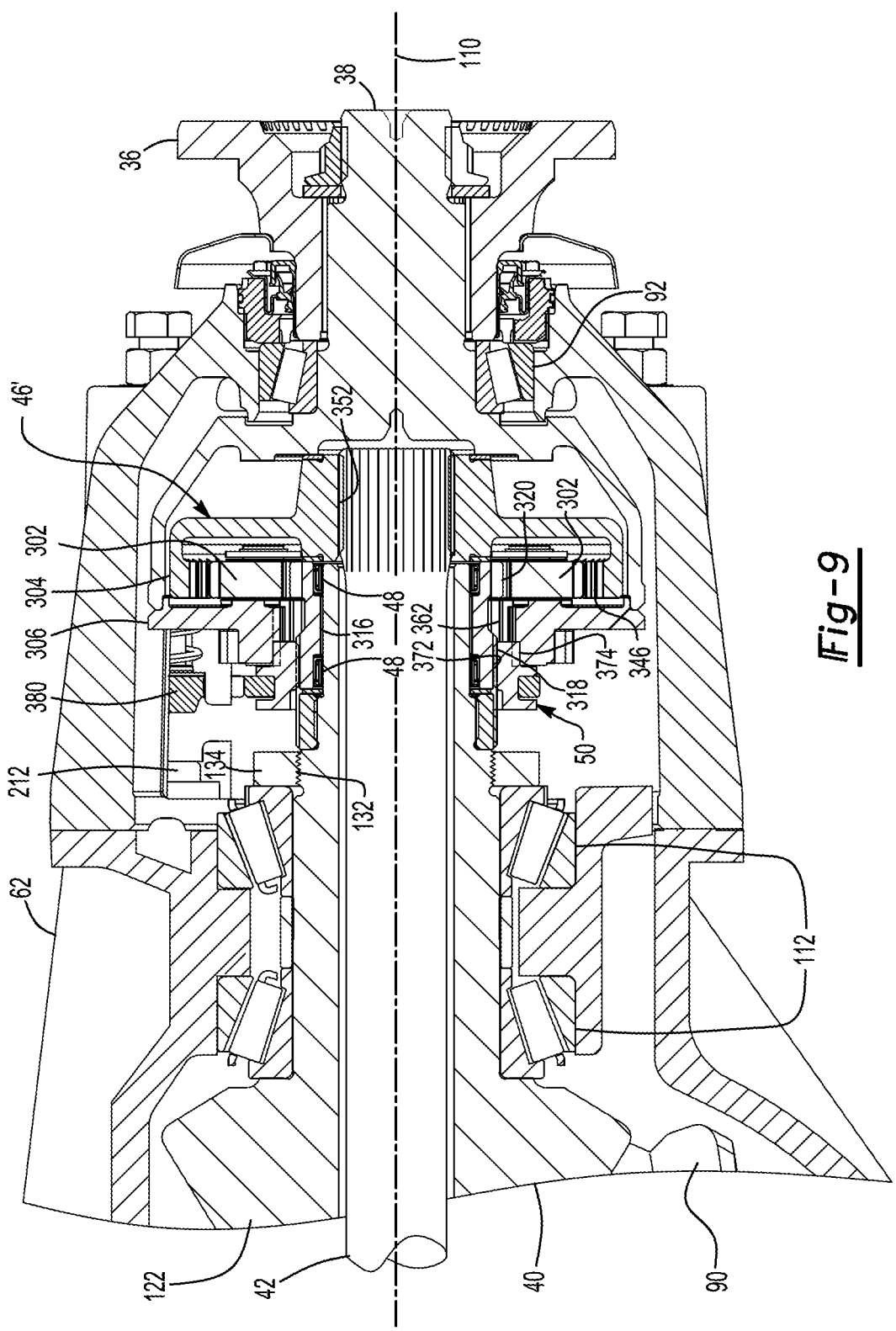
FIG. 9 is a magnified view of the portion of the axle assembly with the interaxle differential lock in a locked position.
Figure 10:
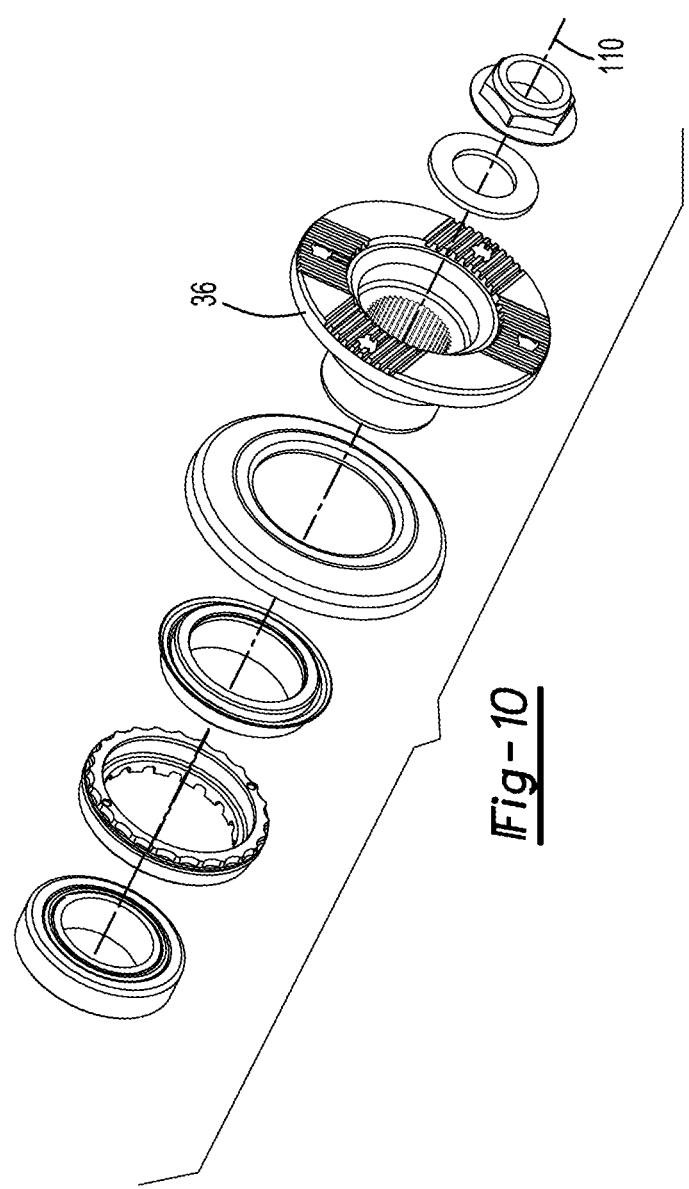
FIGS. 10-12 are exploded views of a portion of the axle assembly shown in FIG. 8.

In FIG. 9, the interaxle differential unit lock 50 is shown in the locked position. The set of internal teeth 372 of the interaxle differential unit lock 50 may mesh or mate with the first set of sun gear teeth 318 but may not mesh or mate with teeth 378 of the drive pinion 40 or that are fixedly positioned with respect to the drive pinion 40. The set of external teeth 374 may mesh or mate with the planet carrier teeth 362 when the interaxle differential unit lock 50 is in the locked position. As such, the sun gear 300 may rotate with the planet gear carrier 306 about the first axis 110 and may be rotatable about the first axis 110 independently of the drive pinion 40. Accordingly, torque may not be transmitted between the sun gear 300 and the drive pinion 40. As an example, input torque that is provided to the input shaft 38 may cause the sun gear 300 to rotate about the first axis 110 with respect to the drive pinion 40 and torque may not be transmitted from the drive pinion 40 to the differential 32 and its associated axle shafts 34 and wheel assemblies 20. Torque may be transmitted between the input shaft 38 and the output shaft 42 via the interaxle differential unit 46 when the interaxle differential unit lock 50 is in the locked position. As an example, input torque that is provided to the input shaft 38 may be transmitted to the output shaft 42 via the planet gear carrier 306, planet gears 302, and the planetary ring gear 304.

Referring to FIG. 1, a control system 400 may monitor and/or control operation of the axle system. The control system 400 may include one or more electronic controllers that may monitor and/or control various components of the drive axle system 12. For example, the control system 400 may be configured to control actuation of the interaxle differential unit lock 50 to operatively connect the drive pinion 40 to the torque source 18 such that torque may be transmitted from the torque source 18 to a differential and to operatively disconnect the drive pinion 40 from the torque source 18 such that torque may not be transmitted from the torque source 18 to a differential.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle system comprising:
a first axle assembly that has a first drive pinion and a first differential assembly that has a first ring gear, wherein the first ring gear and the first drive pinion cooperate to provide a first gear ratio;
a second axle assembly that is operatively connected to the first axle assembly, the second axle assembly having a second drive pinion and a second differential assembly that has a second ring gear, wherein the second drive pinion and second ring gear cooperate to provide a second gear ratio that differs from the first gear ratio;
an interaxle differential unit configured to operatively connect the first axle assembly and the second axle assembly; and
a one-way freewheel clutch that transmits torque between the first axle assembly and the second axle assembly when the interaxle differential unit is unlocked, and that transmits torque to one of the first axle assembly and the second axle assembly when the interaxle differential unit is locked, wherein the interaxle differential unit transmits torque to the second axle assembly but not to the first axle assembly when the interaxle differential unit is locked and the second gear ratio is less than the first gear ratio.

2. The drive axle system of claim 1 wherein the first differential assembly is rotatable about a first differential axis, the second differential assembly is rotatable about a second differential axis, and the one-way freewheel clutch transmits torque between the first axle assembly and the second axle assembly such that the first differential assembly is rotatable in a first rotational direction about the first differential axis and the second differential assembly is rotatable in the first rotational direction about the second differential axis when the interaxle differential unit is unlocked.

3. The drive axle system of claim 1 wherein the interaxle differential unit is disposed in the first axle assembly.

4. The drive axle system of claim 3 wherein the interaxle differential unit and the first drive pinion are rotatable about a first axis.

5. The drive axle system of claim 1 wherein the one-way freewheel clutch is provided with the interaxle differential unit.

6. The drive axle system of claim 1 wherein the interaxle differential unit includes:
a first side gear that receives the first drive pinion;
a second side gear that is fixed to an output shaft; and
a pinion gear that meshes with the first side gear and the second side gear; and
wherein the one-way freewheel clutch receives the first drive pinion and is received in the first side gear.

7. The drive axle system of claim 6 wherein the one-way freewheel clutch couples the first side gear to the first drive pinion such that the first side gear and the first drive pinion are rotatable together when torque is provided to the first side gear in a first direction, and the one-way freewheel clutch permits rotation of the first side gear with respect to the first drive pinion when torque is provided in a second direction that is opposite the first direction.

8. The drive axle system of claim 6 wherein the interaxle differential unit includes a case that receives the first side gear, the second side gear, and the pinion gear, and the interaxle differential unit further comprises an interaxle differential lock that selectively couples the first side gear to the case such that the first side gear and the case are rotatable together when the interaxle differential lock is in a locked position and the case is rotatable with respect to the first side gear when the interaxle differential lock is in an unlocked position.

9. The drive axle system of claim 8 wherein the one-way freewheel clutch is received in the case.

10. A drive axle system comprising:
a first axle assembly that has a first drive pinion and a first differential assembly that has first ring gear wherein the first ring gear and the first drive pinion cooperate to provide a first near ratio;
a second axle assembly that is operatively connected to the first axle assembly, the second axle assembly having a second drive pinion and a second differential assembly that has a second ring gear, wherein the second drive pinion and second ring gear cooperate to provide a second gear ratio that differs from the first gear ratio;
an interaxle differential unit configured to operatively connect the first axle assembly and the second axle assembly; and
a one-way freewheel clutch that transmits torque between the first axle assembly and the second axle assembly when the interaxle differential unit is unlocked, and that transmits torque to one of the first axle assembly and the second axle assembly when the interaxle differential unit is locked, wherein the first differential assembly is rotatable about a first differential axis, the second differential assembly is rotatable about a second differential axis, and the one-way freewheel clutch transmits torque to the first axle assembly to rotate the first differential assembly about the first differential axis in a second rotational direction that is opposite a first rotational direction when the first gear ratio is less than the second gear ratio and the interaxle differential unit is locked.

11. The drive axle system of claim 10 wherein the one-way freewheel clutch transmits torque to the second axle assembly to rotate the second differential assembly about the second differential axis in a second rotational direction that is opposite the first rotational direction when the second gear ratio is less than the first gear ratio and the interaxle differential unit is locked.

12. The drive axle system of claim 10 wherein the interaxle differential unit includes:
a first side gear;
a second side gear that is fixedly positioned with respect to an output shaft; and
a pinion gear that meshes with the first side gear and the second side gear; and
wherein the one-way freewheel clutch receives the first drive pinion and is received in the first side gear.

13. The drive axle system of claim 10 wherein the interaxle differential unit includes:
a planet carrier that is rotatable about an axis with an input shaft;
a planetary ring gear that is rotatable about the axis with an output shaft;
a sun gear; and
a planet gear that is rotatably disposed on the planet carrier and meshes with the planetary ring gear and the sun gear.

14. The drive axle system of claim 10 wherein the one-way freewheel clutch is provided with the interaxle differential unit.

15. A drive axle system comprising:
a first axle assembly that has a first drive pinion and a first differential assembly that has a first ring gear, wherein the first ring gear and the first drive pinion cooperate to provide a first gear ratio;
a second axle assembly that is operatively connected to the first axle assembly, the second axle assembly having a second drive pinion and a second differential assembly that has a second ring gear, wherein the second drive pinion and second ring gear cooperate to provide a second gear ratio that differs from the first gear ratio;
an interaxle differential unit configured to operatively connect the first axle assembly and the second axle assembly, the interaxle differential unit including a case, a first side gear, a second side gear that is fixed to an output shaft, a pinion gear that meshes with the first side gear and the second side gear, and an interaxle differential lock, wherein the case receives the first side gear, the second side gear, and the pinion gear, and the interaxle differential lock selectively couples the first side gear to the case such that the first side gear and the case are rotatable together when the interaxle differential lock is in a locked position and the case is rotatable with respect to the first side gear when the interaxle differential lock is in an unlocked position, the interaxle differential lock including a disc pack that extends around the first side gear and is received in the case; and
a one-way freewheel clutch that transmits torque between the first axle assembly and the second axle assembly when the interaxle differential unit is unlocked, and that transmits torque to one of the first axle assembly and the second axle assembly when the interaxle differential unit is locked.

16. The drive axle system of claim 15 wherein the interaxle differential unit transmits torque to the first axle assembly but not to the second axle assembly when the interaxle differential unit is locked and the first gear ratio is less than the second gear ratio.

17. The drive axle system of claim 15 wherein the interaxle differential unit transmits torque to the second axle assembly but not to the first axle assembly when the interaxle differential unit is locked and the second gear ratio is less than the first gear ratio.

18. A drive axle system comprising:
a first axle assembly that has a first drive pinion and a first differential assembly that has a first ring gear, wherein the first ring gear and the first drive pinion cooperate to provide a first sear ratio;
a second axle assembly that is operatively connected to the first axle assembly, the second axle assembly having a second drive pinion and a second differential assembly that has a second ring gear, wherein the second drive pinion and second ring gear cooperate to provide a second gear ratio that differs from the first gear ratio;
an interaxle differential unit configured to operatively connect the first axle assembly and the second axle assembly, wherein the interaxle differential unit includes:
a planet carrier that is rotatable about an axis with an input shaft;
a planetary ring gear that is rotatable about the axis with an output shaft;
a sun gear that receives the first drive pinion; and
a planet gear that is rotatably disposed on the planet carrier and meshes with the planetary ring gear and the sun gear; and
a one-way freewheel dutch that transmits torque between the first axle assembly and the second axle assembly when the interaxle differential unit is unlocked, and that transmits torque to one of the first axle assembly and the second axle assembly when the interaxle differential unit is locked, wherein the one-way freewheel clutch is received in the sun gear.

19. The drive axle system of claim 18 wherein the one-way freewheel clutch couples the sun gear to the first drive pinion such that the sun gear and the first drive pinion are rotatable together when the torque is provided to the sun gear in a first direction, and the one-way freewheel clutch permits rotation of the sun gear with respect to the first drive pinion when torque is provided in a second direction that is opposite the first direction.

20. The drive axle system of claim 18 wherein the one-way freewheel clutch receives the first drive pinion.

21. The drive axle system of claim 20 wherein the interaxle differential unit includes an interaxle differential lock that selectively couples the sun gear to the planet carrier such that the sun gear and the planet carrier are rotatable together when the interaxle differential lock is in a locked position and the planet carrier is rotatable with respect to the sun gear when the interaxle differential lock is in an unlocked position.

22. The drive axle system of claim 20 wherein the one-way freewheel clutch is received in the planet carrier.

23. The drive axle system of claim 20 wherein a second one-way freewheel clutch is received in the sun gear and the sun gear has a spacer portion that is axially positioned between the one-way freewheel clutch and the second one-way freewheel clutch.

* * * * *

UNITED STATES PATENT AND TRADEMARK OFFICE
CERTIFICATE OF CORRECTION

PATENT NO. : 11,254,206 B2
APPLICATION NO. : 16/827102
DATED : February 22, 2022
INVENTOR(S) : Hayes et al.

Page 1 of 1

It is certified that error appears in the above-identified patent and that said Letters Patent is hereby corrected as shown below:

In the Claims

Column 16, Lines 55-56, Claim 10:
After "and the first drive pinion cooperate to provide a first"
Delete "near"
Insert --gear--.

Column 18, Lines 24-25, Claim 18:
After "and the first drive pinion cooperate to provide a first"
Delete "sear"
Insert --gear--.

Column 18, Line 46, Claim 18:
After "a one-way freewheel"
Delete "dutch"
Insert --clutch--.

Signed and Sealed this
Thirty-first Day of January, 2023

Katherine Kelly Vidal
*Director of the United States Patent and Trademark Office*